C. O. DAWSON.
ICE MAKING APPARATUS.
APPLICATION FILED OCT. 7, 1913.
1,120,604.
Patented Dec. 8, 1914.
2 SHEETS—SHEET 1.
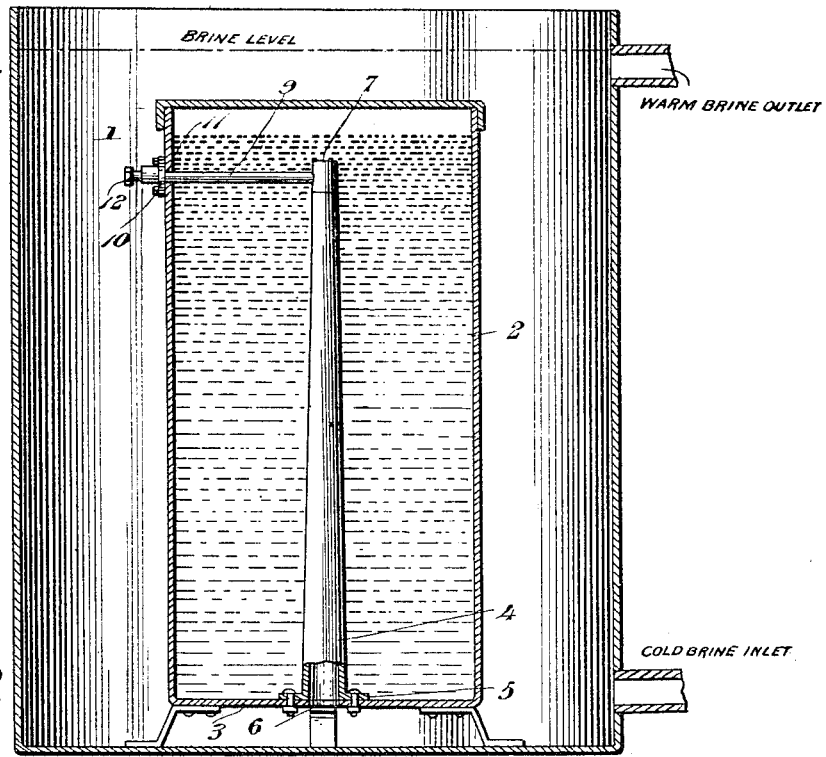
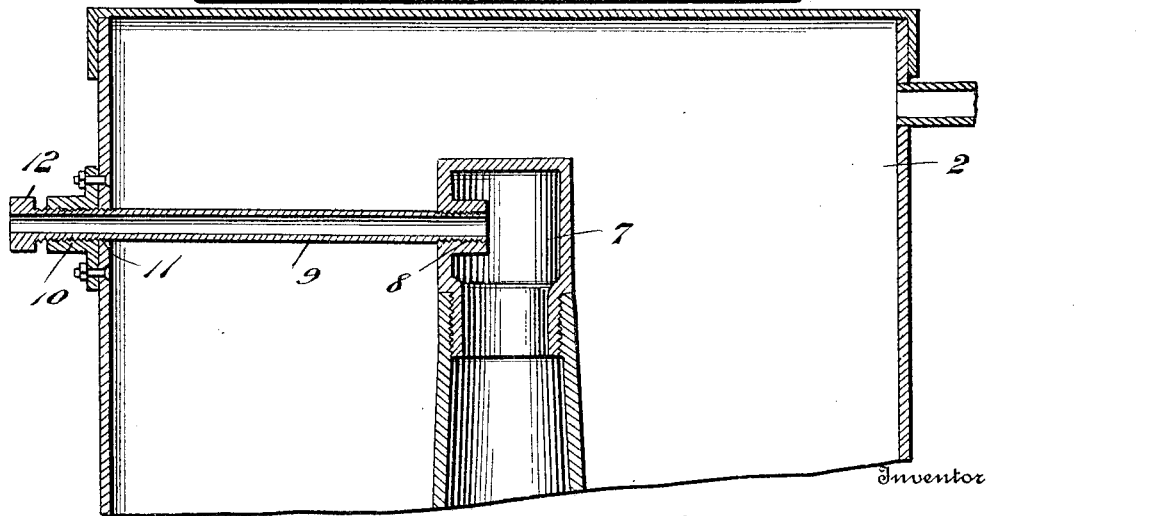
Witnesses
W. S. McDowell
C. C. Hines
Inventor
C. O. Dawson
By Victor J. Evans
Attorney

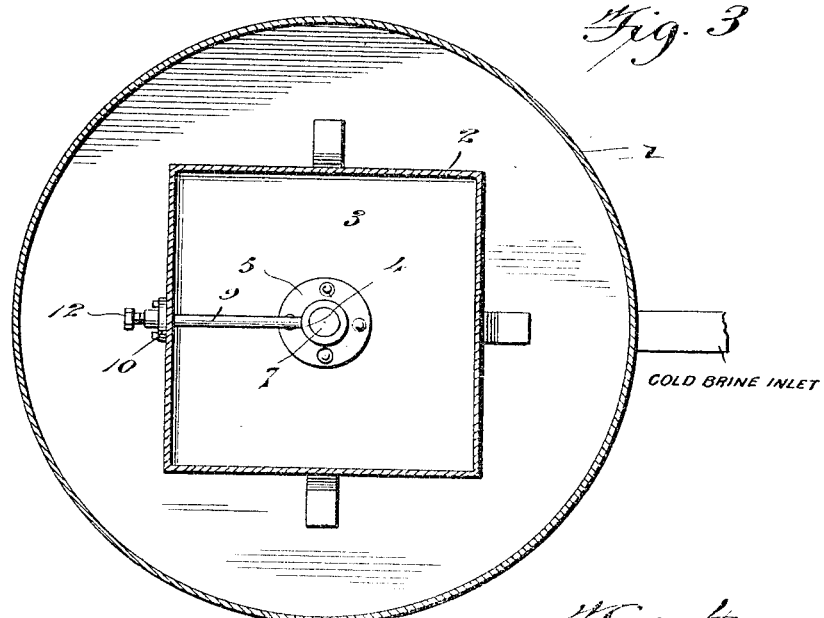
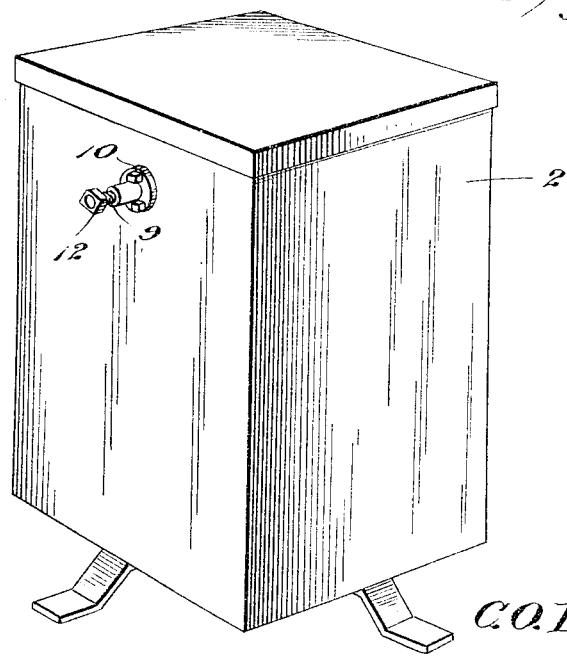

UNITED STATES PATENT OFFICE.

CHARLES O. DAWSON, OF CHETOPA, KANSAS.

ICE-MAKING APPARATUS.

1,120,604.   Specification of Letters Patent.   Patented Dec. 8, 1914.

Application filed October 7, 1913. Serial No. 793,907.

*To all whom it may concern:*

Be it known that I, CHARLES O. DAWSON, a citizen of the United States, residing at Chetopa, in the county of Labette and State of Kansas, have invented new and useful Improvements in Ice-Making Apparatus, of which the following is a specification.

This invention relates to certain new and useful improvements in ice making apparatus of that general type embodying the use of brine tanks and freezing cans, the object of the invention being to provide a means whereby the brine or refrigerating agent may be automatically circulated through the body of water contained in the can, whereby the water is subjected simultaneously to the influence of the refrigerant in the tank and to the influence of the refrigerant circulating through the can, thus freezing the water from the walls of the can inward and from the center of the can outward and materially reducing the period of congelation, while at the same time producing a superior grade of ice.

A further object of the invention is to provide an ice making apparatus of the character specified whereby the necessity of circulating the brine or refrigerating agent through the tank is avoided.

The invention consists of the features of construction, combination and arrangement of parts herein fully described and claimed, reference being had to the accompanying drawings in which:—

Figure 1 is a sectional view through a brine tank and a freezing can contained therein, showing the application of the invention, the parts of the invention appearing in elevation. Fig. 2 is a similar view, showing the parts of the invention in section. Fig. 3 is a sectional plan view through the apparatus. Fig. 4 is a perspective view of the apparatus.

Referring to the drawing, 1 designates a tank containing the brine or refrigerant, which is cooled in any suitable manner, and 2 a refrigerating can disposed therein, which can is filled with a body of water to be converted into ice. The brine within the tank 1 may be cooled by means of refrigerating pipes in the tank, or the brine may be cooled outside the tank and suitable circulating pipes be provided for conducting the cooled brine 2 and discharge the warm brine from the tank. In the present instance I have shown conductors connected with the tank for the latter-named method of cooling.

As shown, the can 2 is provided with a bottom 3 suitably held above the bottom of the tank 1 to provide for the circulation of the brine beneath said bottom 3. Extending vertically within the can 2 is a cooling or circulating tube 4, preferably of conical form and tapering from its lower end upwardly. This tube is provided at its base with a flange 5 fastened to the bottom 3, which is provided with an opening 6 for the upward flow of brine into said tube.

The upper end of the tube 4 is closed by a head 7, having a threaded opening 8 in one of its sides communicating with the tube, into which opening is threaded one of the ends of a laterally extending, horizontally disposed return pipe 9. The opposite or outer end of said return pipe 9 is in threaded engagement with a flanged nipple 10 secured to one of the side walls of the can 2 in line with an outlet opening 11 formed therein. The pipe 9 is provided with an angular surface 12 whereby it may be gripped by a wrench or other suitable tool and turned to apply or remove it.

In the operation of the device, the tank 1 is supplied with brine in the usual way, and the can 2 filled with water and placed in the brine tank. As soon as the can 2 is placed in the tank 1, the brine from the tank 1 flows upwardly into the tube 4, which is initially of the same temperature as the water in the can 2. The brine thus coming in contact with the walls of the tube, which are of a correspondingly higher temperature than the brine tank 1, is warmed by contact with said walls and rises in the tube and flows outwardly through the pipe 9 back into the brine tank, thus establishing a continuous circulation of the brine by thermo-siphonic action. This operation is continued until the heat units are abstracted from the water in the can 2 and complete congelation of the water is effected.

It will be seen that in the congealing action above described, the water in the can 2 is subjected simultaneously to the cooling or heat abstracting action of the brine directly contained in the tank 1, as well as the cooling or heat abstracting action of the brine circulating through the interior circulating attachment, causing the water to be frozen from the walls of the freezing can inwardly and from the center of the can outwardly. By this process of congelation, a more uniformly frozen product is secured, and the period of congelation is reduced to a material degree. When the water in the can 2 is completely frozen, the can is removed from the brine tank and the pipe 9 then unscrewed and removed, allowing the ice to be discharged from the can in the usual manner. In practice, the taper of the tube 4 preferably conforms to the taper of the can, thus enabling the freed ice to be discharged without trouble or interference.

A material advantage arising from the use of my improved center-freezing circulating attachment is that it may be applied to freezing cans of the type customarily employed in ice making apparatus of the character specified without varying the construction thereof, and that owing to the described manner of circulating the brine internally through the body of water the usual process of circulating the brine in the tank 1 may be dispensed with, thus enabling ice to be rapidly made at a very low cost.

I claim:—

1. In an apparatus of the character described, a tank for containing a refrigerating liquid, a freezing can disposed within said tank and having an elevated bottom, a conical tube having a flanged lower end secured to the elevated bottom of the can and communicating therethrough with said tank, said tube extending upwardly into the can, a head closing the upper end of said tube and having a laterally extending threaded aperture, a thimble secured to the side of the can and having a threaded aperture communicating with the can, and a conducting pipe detachably threaded into said head and thimble.

2. In an apparatus of the character described, a tank for containing a refrigerating liquid, a freezing can disposed within said tank and having an elevated bottom, a conical tube in communication at its lower enlarged end with the tank through the bottom of the can and extending upwardly into said can to a point in proximity to the top thereof, a head detachably engaging the reduced upper end of said tube, a nipple upon the exterior of the tank, the latter having an opening in its side wall coinciding with the bore of the nipple, and a horizontal tube or pipe threaded through said opening and nipple and projecting externally therethrough at its outer end and having its inner end threaded into and communicating with the detachable head, the said outer end of the tube being provided with an angular head whereby it may be engaged and rotated.

In testimony whereof I affix my signature in presence of two witnesses.

CHARLES O. DAWSON.

Witnesses:
J. B. COOK,
E. E. CORDERMAN.

Copies of this patent may be obtained for five cents each, by addressing the "Commissioner of Patents Washington, D. C."